United States Patent
Hardin

[15] 3,643,498
[45] Feb. 22, 1972

[54] APPARATUS FOR TESTING SOILS IN SITU

[72] Inventor: Bobby O. Hardin, 767 Bravington Way, Lexington, Ky. 40503

[22] Filed: July 27, 1970

[21] Appl. No.: 58,489

[52] U.S. Cl. ............................73/101, 73/84, 73/88 E, 73/99
[51] Int. Cl. .........................................G01n 3/24
[58] Field of Search ...................73/101, 84, 88 E, 99

[56] References Cited

UNITED STATES PATENTS

| | | |
|---|---|---|
| 3,175,392 | 3/1965 | Tharalson et al. .........................73/84 |
| 3,362,216 | 1/1968 | Hardin et al. .............................73/94 |
| 3,364,734 | 1/1968 | Wilson......................................73/101 |
| 3,552,195 | 1/1971 | Koprowski.................................73/101 |

Primary Examiner—Richard C. Queisser
Assistant Examiner—Marvin Smollar
Attorney—William E. Sherwood

[57] ABSTRACT

Apparatus for determining the stiffness of soil in situ includes a compact, sturdy assembly suitable for insertion into a borehole or for use as a penetrometer. An oscillatory portion of the assembly in coupled contact with the soil generates a signal when actuated by a magnet and coil means serving to oscillate that assembly portion in a controlled electrical circuit.

10 Claims, 8 Drawing Figures

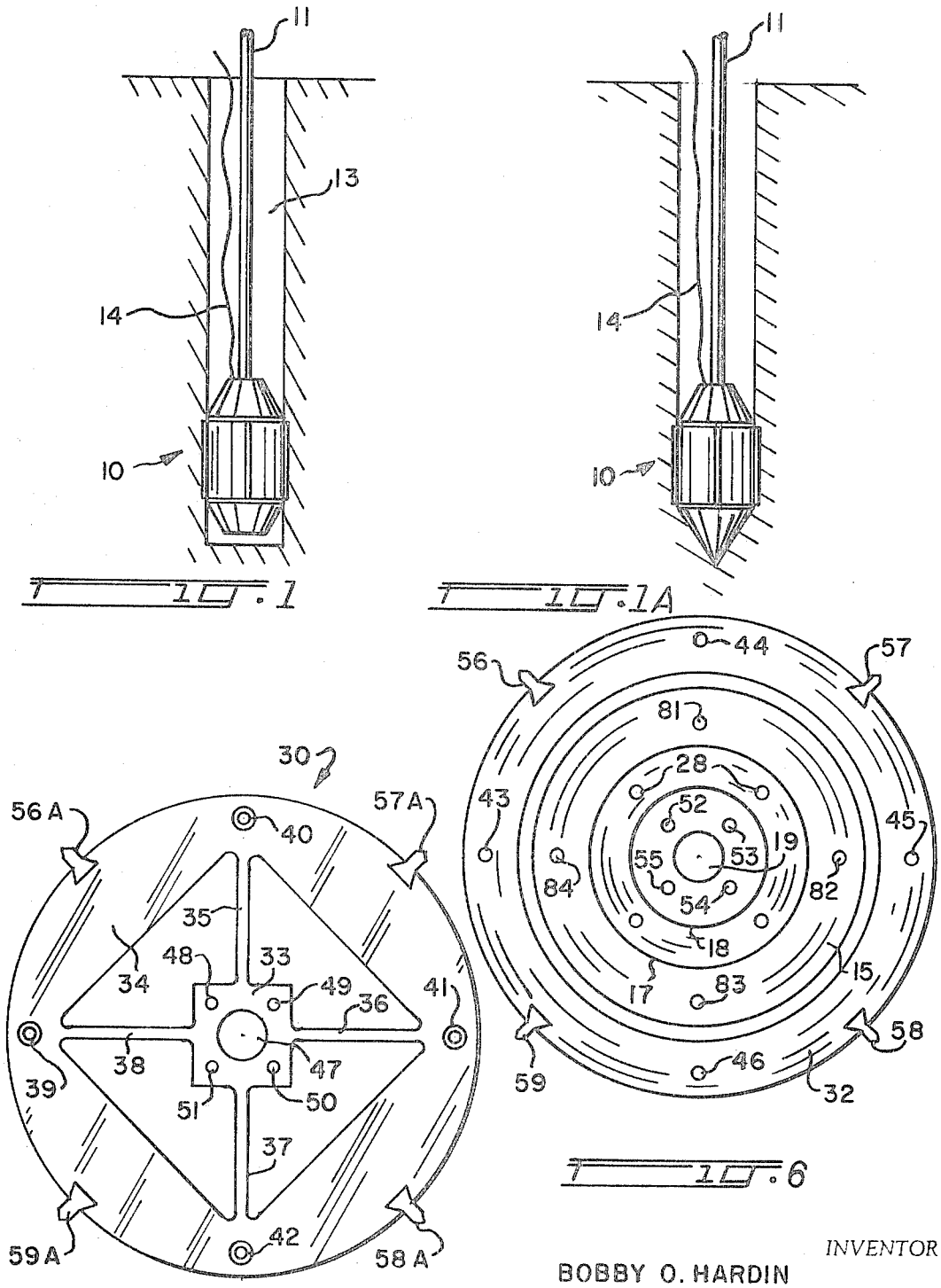

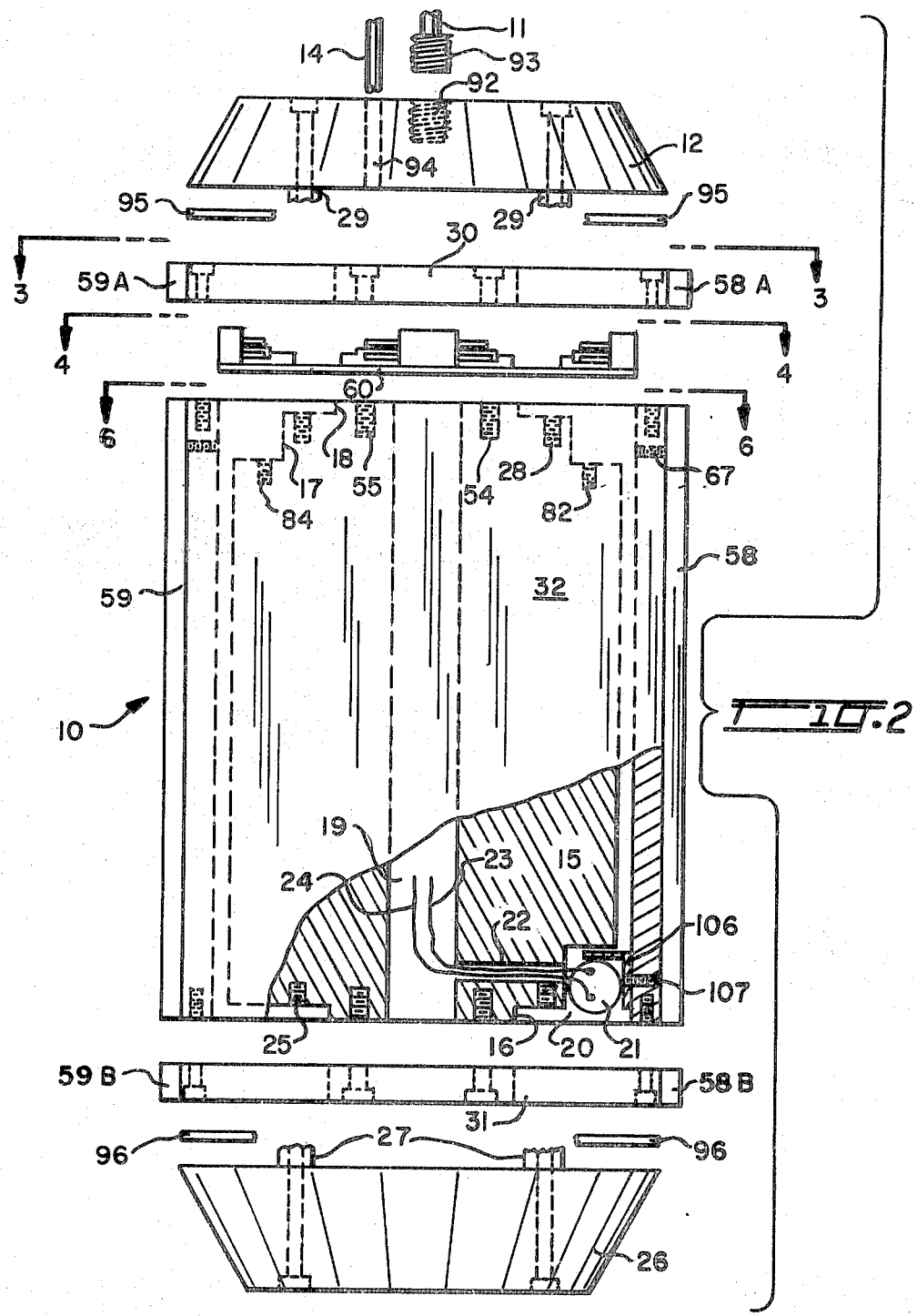

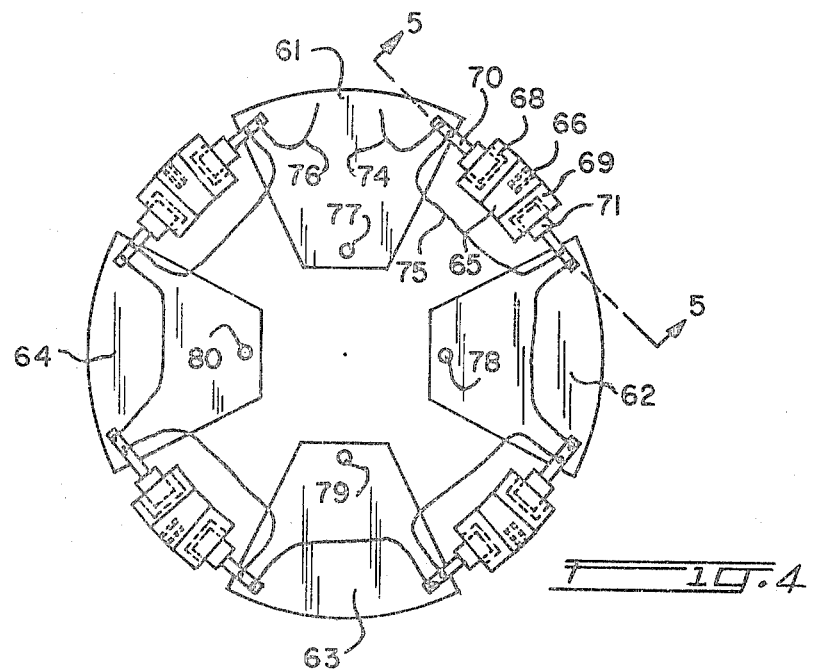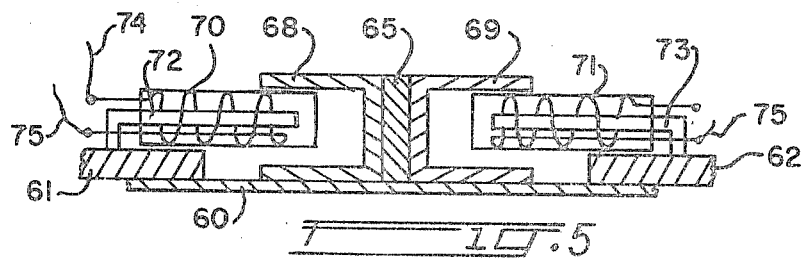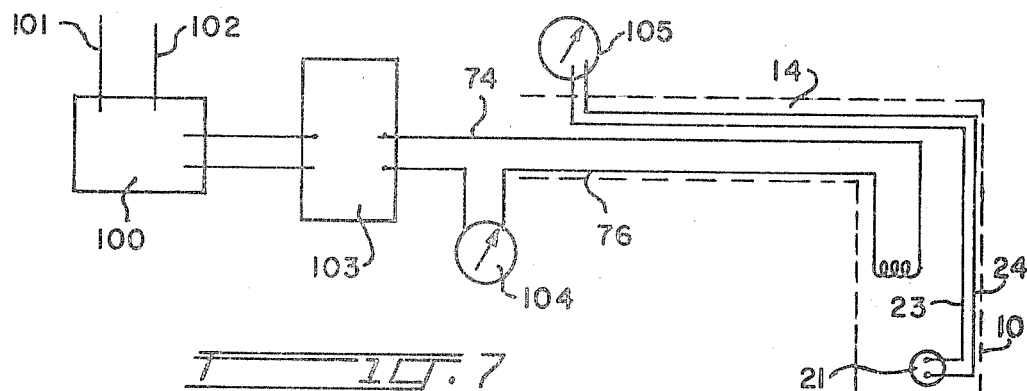

APPARATUS FOR TESTING SOILS IN SITU

BACKGROUND OF THE INVENTION

In many civil engineering and construction projects it is essential to have information as to the characteristics of subsurface soil and generally such information is obtained by removing core samples for later testing, or by employing a penetrometer for in situ testing. One important characteristic of the soil is its shear stiffness under compression and as reflected by the behavior of the soil under torsional vibration. In Hardin et al. U.S. Pat. No. 3,362,216 an apparatus is disclosed in which such behavior of the soil may be secured by testing of cores. However, this requires the use of an aboveground testing structure, the boring of the ground to secure the cores, and the expenditure of considerable time, labor and expense.

By contrast with such conventional methods, the present invention provides for securing essentially the same information as to the shear stiffness of a soil and with the use of simpler apparatus, less labor and reduced expense.

SUMMARY

The invention comprises a compact, portable apparatus which employs an oscillatory sleeve in coupled contact with a soil to be tested in situ, and with the sleeve having a relatively small mass as contrasted to the mass of the apparatus supporting the sleeve in its testing location. The sleeve is actuated by passing a sinusoidal voltage through a magnet and coil assembly rigidly mounted on the sleeve and its supporting structure, and the torsional movement of the sleeve while in contact with the soil is measured at an above-ground location. A signal representative of the shear stiffness of the soil, as derived from the amplitude and frequency of the sleeve movement and the current supplied to the driving coils, it transmitted to the measuring station while current is being applied to the magnet and coil assembly.

Among the objects of the invention are the provision of a compact and sturdy apparatus for testing soil in situ and which is adapted for being forced into the soil in order to reach its testing position therein; the provision of a soil testing apparatus adapted for use in either a preformed borehole or for use as a penetrometer; the provision of a soil-testing apparatus constructed so as to avoid entry of soil particles thereinto while being moved into or removed from the soil; the provision of an oscillatory sleeve type of soil testing apparatus having a large mass supporting structure about which a small mass sleeve structure is oscillated; and the provision of an improved soil testing apparatus for positioning in a soil and constructed for passing electrical current to and from the apparatus while located below ground.

These and other objects and advantages of the invention will become more apparent as the description proceeds and when considered in conjunction with the accompanying drawings in which FIG. 1 is a diagrammatic view illustrating the apparatus in position within a borehole. FIG. 1 A is a diagrammatic view illustrating the apparatus when employed as a penetrometer.

FIG. 2 is an exploded view of the portion of the apparatus adapted to occupy the borehole, parts being broken away for purposes of illustration.

FIG. 3 is a plan view of one of the sleeve-cradling members, as seen on line 3—3 of FIG. 2.

FIG. 4 is a plan view of the coil-magnet assembly as seen on line 4—4 of FIG. 2.

FIG. 5 is a sectional view to a larger scale as taken on line 5—5 of FIG. 4.

FIG. 6 is a plan view of the core and sleeve as taken on line 6—6 of FIG. 2, and FIG. 7 is a schematic view of the apparatus illustrating electrical circuits.

Referring now to FIGS. 1, 1A and 2, the apparatus comprises a testing assembly generally indicated at 10 and which is adapted for insertion into the ground by means of a conventional rod or the like 11 detachably connected to an upper cap 12 of the assembly. The rod may be actuated by any suitable means, not shown, for the purpose of raising and lowering the assembly in a preformed borehole 13 or for forcing the assembly into the ground with a penetrometer action. A cable 14 encasing the wires of the electrical circuits, later to be described, extends from the assembly to suitable data indicating apparatus disposed above the ground.

As a significant feature, the assembly comprises a portion having a relatively large mass and resulting large inertia, and a portion with a relatively small mass and resulting small inertia. As best seen in FIGS. 2 and 6 a massive generally cylindrical core 15 having a shoulder 16 at its lower end and having two spaced shoulders 17, 18 at its upper end is provided. An axial hole 19 extends through the core and at its lower end the core also is cut away to provide a recess 20 for housing a seismic velocity pickup unit 21 or equivalent signalling means. A hole 22 connects that recess with hole 19 and accommodates wires 23, 24 later to be described.

A pattern of tapped holes 25 is employed in the lower face of the core to receive bolts (not shown) serving to connect the lower cap 26 of the assembly to the core. Tubular spacers 27 surround those bolts and are interposed between the confronting faces of the core and the lower cap 26 thus to space the parts in proper position when the elements are fully assembled. Likewise, a pattern of tapped holes 28 is employed in the upper end of the core to receive bolts (not shown) serving to connect the upper cap 12 to the core; and tubular spacers 29 surrounding those bolts and interposed between the confronting faces of the upper cap and the core act to space the parts when the elements are fully assembled. The lower cap 26, whether in the truncated cone form or the true conical form, later to be described, will have a maximum diameter not less than the outer diameter of the sleeve with which it is associated.

Passing now to FIGS. 2 and 3, an upper sleeve-cradling member 30 and a lower sleeve-cradling member 31 whose constructions may be identical, are employed as the preferred means for mechanically connecting a low inertia tubular sleeve 32 and the high inertia core when the apparatus is assembled. These members may be machined from a flat disc of metal in such manner as to leave a generally square central boss portion 33 attached symmetrically to interconnected peripheral portions 34 by narrow webs 35 to 38 serving as flexible spring supports. Countersunk holes 39 to 42 at the edges of the peripheral portions are adapted to receive short bolts (not shown) which pass into tapped holes 43 to 46 (FIG. 6) in the end edge of sleeve 32. Moreover, the central boss portion 33 includes a hole 47 for receiving the wires leading to cable 14. The sleeve-cradling member 30 also is provided with holes 48 to 51 for reception of short bolts (not shown) adapted to engage in tapped holes 52 to 55 in the upper end of the core and which when tightened brings the central boss portion 33 into clamping relation with the flat end of the core above shoulder 18. The configuration of shoulder 18 insures that no binding between the upper end of the sleeve and the peripheral sections 34 of the cradling member will occur. Also the configuration of shoulder 17 serves to provide space within which the sleeve-actuating assembly, now to be described, may conveniently be housed.

For the purpose of coupling the oscillatory portion of the apparatus to the ground to be tested, the sleeve 32 is provided with a plurality of dovetail slots (FIG. 6) in which symmetrically spaced vanes 56 to 59 are respectively housed and bonded to the sleeve with a suitable adhesive. These vanes which, for example, may project about one-eighth inch beyond the circumference of the sleeve, will slice into the surrounding compacted soil as the apparatus is moved to its testing position and will serve to couple the assembly to the soil when oscillatory movement of the sleeve later occurs. Preferably the length of these vanes corresponds to the length of the sleeve and in addition complementary vanes 56A to 59A are provided on the periphery of the sleeve-cradling member 30, as are complementary vanes on the lower member 31, two of which are seen at 58B and 59B and with the respective vanes being in prolongation with each other.

For imparting oscillatory motion to the sleeve, magnet-coil portions of the sleeve-actuating assembly, as best seen in FIGS. 4 and 5, are nested around the upper end of the core. This assembly may, if desired, be arranged upon a round disclike thin mounting support 60 (FIG. 5) and includes four pie-shaped thin plates 61 to 64 symmetrically spaced from each other. Intermediate the thin plates are four permanent magnet assemblies each of which comprises a central bracket section 65 shaped on its outer face to contact the inner surface of sleeve 32 and having a tapped hole 66 into which a fastening may be secured upon passage through a corresponding hole 67 (FIG. 2) in the sleeve, thereby to secure the bracket rigidly to the sleeve.

Projecting laterally from each bracket and secured thereto as by adhesive are cup-shaped permanent magnets 68, 69 adapted to receive respectively a pair of coils 70, 71 surrounding suitable coil supporting cores 72, 73 rigidly attached to the respective thin plates 61 and 62. A conductor 74 extending from cable 14 leads to coil 70 and a conductor 75 leads from coil 70 to coil 71. In like manner, each coil of the entire sleeve-actuating assembly is connected in series, and with a return conductor 76 leading back to the cable. The described coils are preferably supported so as to remain out of physical contact with the magnets. The wires from such coils, as well as the several conductors leading to cable 14 preferably are waterproofed by any suitable coating material, as is the seismic pickup unit 21.

The several thin plates are provided with holes 77 to 80 in matching relation to the pattern of tapped holes 28 in the upper face of core 15 and short bolts (not shown) are employed to secure these thin plates in rigid relation to the core when the parts are assembled. When using the support plate 60, which includes a central aperture to accommodate the shoulder 17 of the core, holes also are provided in that support plate and through which these short bolts may freely pass. Thus, when assembled in the described manner, the permanent magnets and their brackets and with the sleeve attached to the brackets (all of which comprise a relatively small mass) will be oscillated in a plane normal to the axis of assembly 10 whenever a sinusoidal voltage is passed through conductors 74 and 76.

As will be apparent, this operation may be carried out when using two or more of the described magnet-coil arrangements symmetrically spaced and is not necessarily limited to the eight magnets and coils as shown. The support plate 60 serve essentially as a convenient way of arranging for temporary positioning of the several loose parts. After the described sleeve-actuating assembly is in proper position the several brackets 65 are secured to the sleeve by bolts passing through the holes 67 in that sleeve. In addition, the pie-shaped plates are secured to the upper end of the core by bolts (not shown) passing into tapped holes 81 to 84 in the core and through the respective holes 77 to 80 in these plates. Thereafter, the upper sleeve-cradling member 30 is secured to the upper end of the sleeve by other bolts passing into the tapped holes 43 to 46. The central boss 33 of member 30 meanwhile is secured to the upper end of the core by still other bolts passing into tapped holes 52 to 55.

At this time the wires 22, 23, 74 and 76 will, of course, be extending into and housed within the cable 14. As seen in FIG. 2, the upper cap 12 is provided with a threaded hole 92 for detachably receiving a coupling 93 at the lower end of rod 11, and also includes a hole 94 through which the protective cable 14 extends. By contrast, the lower cap 26 comprises a solid member which may have the shape of a truncated cone when borehole usage of the apparatus is intended, or the shape of a true cone (FIG. 1A) when penetrometer usage is intended.

In order to prevent entry of soil particles into the interior of the assembly a pair of annular gaskets 95, 96 are interposed respectively between the upper and lower caps and the adjacent upper and lower sleeve-cradling members. These gaskets are of a readily deformable material and when the parts are assembled by drawing the same together to the limit afforded by the spacers 27 and 29, the interior of the assembly is enclosed and at the same time no binding occurs between the oscillatory peripheral sections of the members 30, 31 and the confronting surfaces of the caps 12 and 26.

Considering now FIGS. 1, 1A and 7, the above-ground equipment employed with the invention may comprise a conventional audio-oscillator 100 such as Model HP200 AB available from Hewlett-Packard Co., Dayton, Ohio and which has a calibrated dial from which the frequency of excitation is shown. The oscillator is energized from conductors 101, 102 supplying alternating current and if more power is required by the apparatus a conventional AC amplifier 103 may be connected to the oscillator. Extending from the amplifier, or from the oscillator, are the aforementioned conductors 74, 76 encased in cable 14 and leading to the magnet-coil assembly in unit 10 which is to be disposed below ground. In addition, conductor 76 is connected through a conventional current measuring device 104 such as a meter. Also contained in cable 14 are the conductors 23, 24 extending to the seismic pickup unit 21 which conveniently may be the type EV 22B Horizontal available from Electro-Technical Laboratories Division of Mandrel Industries, Inc., Houston, Tex. These conductors 23, 24 may, for example, be connected above ground to an appropriate data indicating device 105 such as a calibrated AC meter or oscilloscope. The unit 21 may conveniently be secured by adhesive to the confronting surfaces of a bracket 106 occupying the space 20 formed in core 15. Such bracket may be rigidly attached as by a bolt 107 to the sleeve 32 so as to effect movement of the unit 21 as the sleeve is oscillated, sufficient play being provided in conductors 23, 24 to accommodate such movement. Other arrangements, for example the use of an accelerometer and associated cathode follower, may be employed in lieu of the described pickup unit 21, without departing from the invention.

In the practice of the invention the equipment is transported to the site and, if a borehole is to be used, that borehole is formed with suitable auxiliary means and the rod 11 is then attached to assembly 10. The rod is then moved slowly downward in the borehole to the desired below ground testing position. At this time the vanes on unit 10 are sliced into the soil and are physically coupled with that soil. Operation of the oscillator 100 is then begun, causing the sleeve to oscillate and a signal to be transmitted from the pickup unit. Accordingly the readings on meter 104, the oscillator 100, and the device 105 then serve to provide information representative of the stiffness of the soil at the depth at which the sleeve is operating. Depending upon the formulas employed, the measuring may be based upon resonant frequency, or upon the amplitude of vibration and the value of current through the coils, when calibrated to give the force applied by the magnet-coil system.

As will be noted, the rod 11 as well as the described heavy mass portions of the assembly 10 provide essentially a stationary mass with respect to which the relatively light mass of the sleeve is moved by the coils against the restoring action of the thin spring supports 35 to 38 and the resistance of the soil coupled with the sleeve. That resistance of the soil will, of course, depend upon the characteristics of the soil and which soil, of course, is also under compression commensurate with the depth at which the test occurs.

For use with soft soils the apparatus may also be employed as a penetrometer in which event the rod 11 is used to force the assembly 10 vertically into the ground as indicated generally in FIG. 1A. Due to the described sturdy construction the assembly 10 may be subjected to heavy pushing stresses from rod 11 and without damage to the cradled sleeve or to the sleeve-actuating assembly housed in the sleeve.

Having thus described the combination of coordinated apparatus with which the invention may be practiced, it will be understood that the invention may be embodied in other forms of apparatus without departing from the scope of the appended claims.

What is claimed is:

1. Apparatus for testing the characteristics of soil in situ and comprising a testing assembly adapted for insertion into the soil and including an oscillatory tubular sleeve having means on its periphery for contacting the surrounding soil, a massive core member disposed within the sleeve, means mounting the sleeve on said core for oscillatory movement with respect thereto, a top cap and a bottom cap rigidly connected to said core member and spaced respectively therefrom sufficiently far to avoid binding of the sleeve member against said caps, means for imparting to said sleeve and to the soil to be tested a controlled oscillatory movement, and means for measuring the motion of said sleeve during its oscillatory movement thereby to determine the characteristics of the soil with which said sleeve is coupled.

2. Apparatus as defined in claim 1 wherein said assembly includes a vertically movable member detachably connected to said top cap and serving to force said assembly into coupling contact with said soil.

3. Apparatus as defined in claim 2 wherein said bottom cap comprises a truncated conical form and said movable member is adapted to force said assembly into a preformed borehole in said soil.

4. Apparatus as defined in claim 2 wherein said bottom cap comprises a conical member acting as a penetrometer and said movable member is adapted to force said assembly directly into said soil.

5. Apparatus as defined in claim 1 wherein said soil contacting means on said sleeve comprises a plurality of longitudinal vanes uniformly spaced about the sleeve periphery and extending radially outward therefrom.

6. Apparatus as defined in claim 1 including gaskets disposed beneath said top cap and above said bottom cap and serving to prevent entry of soil within said sleeve.

7. Apparatus as defined in claim 1 wherein said means for mounting said sleeve on said core comprises a sleeve-cradling member including a central portion attachable to said core and a peripheral portion attachable to said sleeve, said portions being joined by a plurality of flexible spring elements.

8. Apparatus as defined in claim 1 wherein said means for imparting oscillatory movement to said sleeve includes a permanent magnet attached to said sleeve, and an electrical coil attached to said core and disposed in the field of said magnet, and an electrical circuit for passing a sinusoidal voltage through said coil.

9. Apparatus as defined in claim 1 wherein said means for measuring the motion of said sleeve comprises a seismic pickup unit attached to the interior of said sleeve.

10. Apparatus as defined in claim 1 wherein said means for imparting movement to said sleeve and said means for measuring motion of the sleeve includes electrical conductors housed in a cable passing through said top cap.

* * * * *